Figure 1:
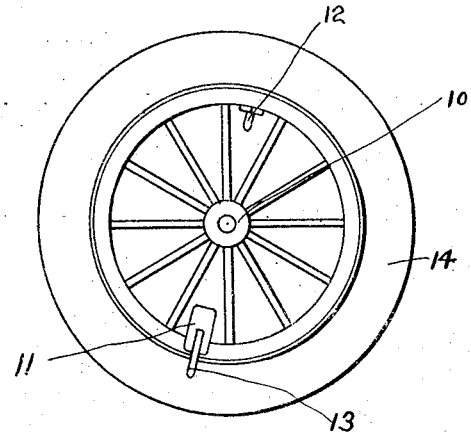
Figure 2:
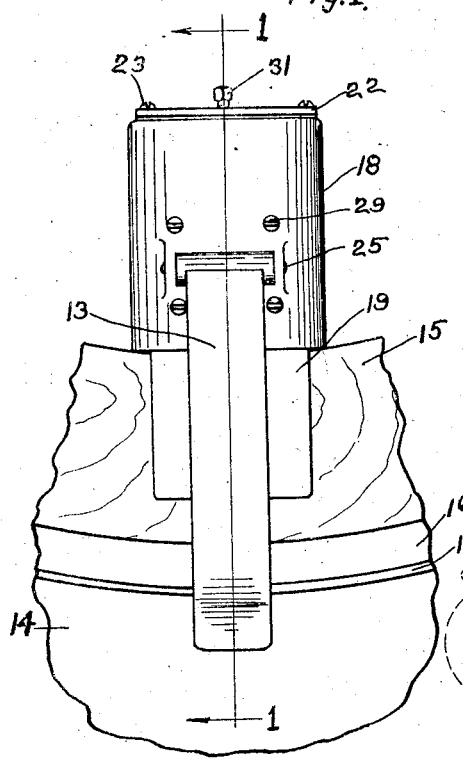
Figure 3:
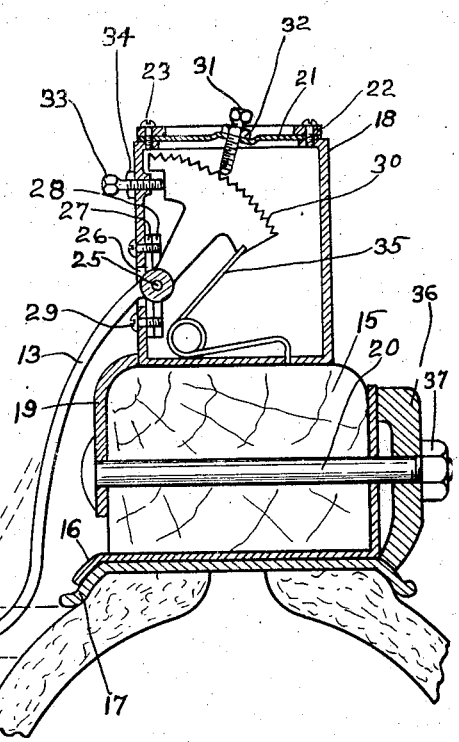

March 1, 1927.                                              1,619,450
                        B. D. WELLS
              DEFLATION ALARM FOR PNEUMATIC TIRES
                    Filed Feb. 18, 1921

INVENTOR
Burling D. Wells

Patented Mar. 1, 1927.

1,619,450

UNITED STATES PATENT OFFICE.

BURLING D. WELLS, OF DANBURY, CONNECTICUT, ASSIGNOR TO ROBERT S. BLAIR, OF STAMFORD, CONNECTICUT.

DEFLATION ALARM FOR PNEUMATIC TIRES.

Application filed February 18, 1921. Serial No. 446,161.

This invention relates to alarms for use for wheels equipped with pneumatic tires and which will give warning whenever the tire is deflated entirely or partly.

One of the objects thereof is to provide means to give warning upon a pneumatic tire becoming soft. Another object is to give warning whenever a safe degree of deflation has been passed. Another object is to provide an alarm which shall be reliable in action and at the same time simple in construction and easy of application. Another object is to provide an alarm of compelling character in action but quiet at all other times. Another object is to provide an alarm which shall be in condition to operate at all times and unaffected by the elements, especially mud and ice.

The invention accordingly consists in the features of construction, combination of elements and arrangement of parts which will be exemplified in the structure hereinafter described and the scope of the application of which will be indicated in the following claims.

Figure I is a diagrammatic side elevation of a pneumatic tired wheel having mounted upon the inside of the felloe a signalling device.

Figure II is an enlarged view of the signalling device in side elevation showing the method of mounting upon the felloe of the wheel.

Figure III is a cross sectional elevation of the device shown in Figure II, the section being taken along the line 1—1 in Figure II in the direction as shown by the arrows. The felloe and a section of the attached tire are also shown in cross section and the dotted outline at the left of Figure III shows the position assumed by the tire and the mechanism co-acting therewith upon the tire becoming entirely deflated.

Similar characters refer to similar parts throughout in the several views of the drawings.

Turning now to the drawings we have in Figure I a pneumatic tired wheel 10 having mounted on the inside of the felloe a signalling device 11 diametrically opposite the valve 12. The signalling device 11 has an actuating member 13 projecting in a radial direction with regards to the center of the wheel and adjacent to the tire 14. This signalling device 11 is so mounted that the actuating member 13 is on that side of the wheel opposite to the side from which the tire is removable. In other words, if we consider this wheel 10 mounted upon a vehicle the actuating member 13 would be on the inside side of the wheel. Turning now to Figure II we have at 15 a section of the felloe of the wheel 10 and its related parts, the reinforcing rim 16, the demountable tire rim 17 and the section of the pneumatic tire 14. Mounted upon the inside of the felloe 15 is a casing 18 having a lug 19 integral therewith and bent down to conform to the exterior surface of the felloe and passing under the head of the lug bolt 20. The lug bolt 20 and the lug 19 are more clearly shown in their exact relation in Figure III.

In Figure III we have at the upper end of the casing 18 a thin diaphragm 21 rigidly held against the flange on the upper end of the casing 18 by the clamping ring 22 and the screws such as 23, suitable packing being interposed between the diaphragm 22 and the casing 18 to insure a water tight joint. An actuating member 24 is journaled upon the pin 25 which passes through and is journaled in the casing 18 just inside of the pin 26 in the casing 18 as shown. The actuating member 24 is enlarged at the point where the pin 25 passes through it and is given a substantially cylindrical form whose axis is co-incident with the axis of the pin 25, the function of this cylindrical surface is to act in conjunction with the packing piece 27 which is clamped between the casing 18 and the clamping plate 28 by the screws such as 29 to form a stuffing box which will prevent water and other foreign substances from entering the casing 18 yet at the same time permitting an appreciable relative rotary movement of the actuating member 24 about the pin 25 as an axis unhampered by excessive friction due to mud and the like. The exterior end of the actuating member 24 is curved outward away from the lateral surface of the tire so as not to present any sharp edge to the tire thus avoiding any chance of damage to the tire by the signalling device itself. It is my intention to form this exterior end of the actuating member 24 of some resilient substance so that in the event of this member coming into contact with any obstruction in the road over which the wheel is rolling it will yield and thus save itself and the attached mechanism from breakage.

For simplicity I have shown this actuating member in Figure III as being made up of one strip of metal which for all ordinary use would be sufficient but where extreme reliability is required it could be made of resilient metal as hitherto expressed. The inside end of the actuating member 24 is shaped to form a sector of a circle, the outside of the sector being provided with notches or teeth such as 30 adapted to engage with an adjustable point 31 mounted in the diaphragm 21 and locked in position by the lock nut 32. An adjustable limit screw 33 is threaded through the casing 18 and is locked in position by the lock nut 34 and the interior end of the actuating member 24 is held against this adjusting screw 33 at all times when the signal is not giving warning, by means of the spring 35, the ends of which spring engage with the sector shaped end of the actuating member 24 and the casing 18 respectively as shown in the drawing in Figure III. The adjusting screw 33 may be so adjusted that the exterior end of the actuating member 24 will be at any desired distance from the lateral surface of the tire and by reason of this adjustment the signal may be adjusted to operate and give warning upon the deflation of the tire 14 having passed beyond any desirable point. A tire lug 36 clamped against the side of the felloe 15 by the bolt 20 and the nut 37 holds the tire rim 17 securely on the felloe 15, a shoulder on the inside of the felloe reinforcing strip 16 engaging with the side of the tire rim 17 limiting its inward movement in respect to the wheel.

The action of the signalling device is as follows: Starting with the mechanism in position as shown in Figure III with the actuating member 24 up against the adjustable stop 33 and with the adjustable point 31 in the center of the diaphragm 21 adjusted to engage with the teeth 30 on the inside end of the actuating member 24, if now the vehicle upon which the wheel 10 is mounted should roll along the ground, the part of the tire adjacent to which the actuating member 13 is mounted will at intervals come into contact with the surface of the road and if the inflation pressure of the tire 14 is proper there will be no deformation of the normal inflated shape of the tire other than would occur in a properly inflated tire and the actuating member 13 will not come in contact with the tire or be moved in any way whatsoever except should it be struck by some stone or other projection in the roadbed, but if the pressure in the tire 14 should become diminished by reason of a puncture or some other similar cause so that the tire is appreciably flattened out where it comes into contact with the road surface, each time the part of the tire 14 adjacent to the signalling device 11 comes into contact with the road the actuating member 24 will be moved up towards the position shown by the dotted lines in Figure III due to the tire increasing in width because of the flattening out of the tire at its point of contact with the road surface. Thus at each revolution of the wheel an impulse will be given to the actuating member 24 and the inner end of this actuating member will be moved away from the adjusting screw 33 compressing the spring 35 and drawing the teeth 30 across the adjusting point 31 which is mounted in the center of the diaphragm 21 thus setting the diaphragm 21 in vibration causing the emission of an easily audible sound repeated as spring 35 returns the parts. It is the intention that the mechanism will be so adjusted that the sound caused by the vibration of the diaphragm 21 will be so discordant and loud that it could not easily be mistaken for some other noise about the mechanism of the car. If it is desired that the signalling device shall give warning before the tire becomes entirely flat this may be accomplished by unscrewing the adjusting screw 33 so that the end of the actuating member 24 adjacent to the tire will very closely approach the lateral side of the tire.

As various possible embodiments might be made of the above invention and as various changes might be made in the embodiment above set forth, it is to be understood that all matter herein set forth or shown in the accompanying drawings is to be interpreted as illustrative and not in a limiting sense.

Having described this invention, I claim:

1. In a pneumatic tire deflation signalling device, in combination, a wheel provided with a pneumatic tire, an audible signal mounted on said wheel and comprising a casing, means in said casing adapted to operate said signal, means outside said casing adapted to be actuated upon deflation of the tire, a part extending through said casing to connect said outside means with said operating means, and a dust-excluding device co-acting with said part to exclude dust from the interior of said casing.

2. In a pneumatic tire deflation signaling device, in combination, an audible signal mounted upon a wheel and comprising a substantially closed casing, an actuating member projecting through said casing adapted to coact with the tire and upon movement thereby in one direction to operate said signal, means urging said member in the opposite direction, and means coacting with said member inside said casing and adjustable from the outside thereof adapted to limit the movement of said member toward said tire and normally hold said member out of engagement with said tire.

3. In a pneumatic tire deflation signalling device, in combination, an audible signal mounted upon a wheel, means comprising a tire-actuated member adapted on movement in one direction to operate said signal, a spring urging said member in the opposite direction, means adapted to limit the movement of said member in the direction toward said tire, and means adapted to adjust said limiting means.

4. In a deflation alarm for pneumatic tires, in combination, an audible signal mounted upon a pneumatic-tired wheel and comprising a frame secured to the wheel, a vibratory diaphragm mounted in said frame, a rigid member projecting from said diaphragm adapted to be struck to cause said diaphragm to sound, a lever pivoted upon said frame and extending therefrom toward the side of the tire, the end portion of said lever being normally adjacent to a portion of the side wall of the tire and in a position wherein it is spaced from the side wall of the tire when the tire is running in normally inflated condition, and wherein it is adapted to be engaged by said side wall and swung upwardly thereby when said side wall portion is bulged outwardly due to the tire being not properly inflated, spring means tending to hold said lever in said normal position, and means actuated by swinging of said lever adapted to strike said rigid member on said diaphragm and cause said diaphragm to sound.

5. In a deflation alarm for pneumatic tires, in combination, an audible signal mounted upon a pneumatic-tired wheel and comprising a frame secured to the wheel, a vibratory diaphragm mounted in said frame, a rigid member projecting from said diaphragm and adapted to be struck to cause said diaphragm to sound, a lever pivoted upon said frame and extending therefrom toward the side of the tire, the end portion of said lever being normally adjacent to a portion of the side wall of the tire and in a position wherein it is spaced from the side wall of the tire when the tire is running in normally inflated condition, and wherein it is adapted to be engaged by said side wall and swung upwardly thereby when said side wall portion is bulged outwardly due to the tire being not properly inflated, spring means tending to hold said lever in said normal position, and a part at the end of said lever adjacent said diaphragm adapted when said lever is swung about its pivot to strike said rigid member upon said diaphragm and cause said diaphragm to sound.

6. In a deflation alarm for pneumatic tires, in combination, an audible signal mounted upon a pneumatic-tired wheel and comprising a substantially enclosed casing having a vibratory diaphragm forming one wall thereof, a rigid member projecting from a portion of said diaphragm into the interior of said casing and adapted to be struck to cause said diaphragm to sound, a lever pivoted upon the wall of said casing and extending therefrom toward the side of the tire, the end portion of said lever being normally adjacent to a portion of the side wall of the tire and in a position wherein it is spaced from the side wall of the tire when the tire is running in normally inflated condition, and wherein it is adapted to be engaged by said side wall and swung upwardly thereby when said side wall portion is bulged outwardly due to the tire being run when not properly inflated, spring means tending to hold said lever in said normal position, and means within said casing actuated by swinging of said lever adapted to strike said rigid member projecting from the inner side of said diaphragm and cause said diaphragm to sound.

7. In a deflation alarm for pneumatic tires, in combination an audible signal mounted upon a pneumatic-tired wheel and comprising a frame secured to the wheel, a vibratory diaphragm mounted in said frame, a rigid member projecting from said diaphragm and adapted to be struck to cause said diaphragm to sound, a lever pivoted upon said frame and extending therefrom toward the side of the tire, the end portion of said lever being normally adjacent to a portion of the side wall of the tire and in a position wherein it is spaced from the side wall of the tire when the tire is running in normally inflated condition, and wherein it is adapted to be engaged by said side wall and swung upwardly thereby when said side wall portion is bulged outwardly due to the tire being not properly inflated, spring means tending to hold said lever in said normal position, and means actuated by swinging of said lever adapted to strike said rigid member on said diaphragm and cause said diaphragm to sound, said lever being of flat spring metal adapted to bear against a substantial area of the side wall of said tire and being adapted to yield and spring back to its original contour if bent by striking an obstruction in the road.

8. In a pneumatic tire deflation signaling device, in combination, an audible signal mounted upon a pneumatic-tired wheel, a member mounted to swing and having a portion operatively related to said signal and adapted upon movement to strike and sound the same, and having a portion positioned adjacent said tire adapted to be engaged thereby upon said tire running soft and to be swung to sound said signal and adapted to be positioned out of the path of deformation of said tire when said tire is running in normally inflated condition, means urging said member to swing toward said tire, and adjustable means adapted to limit said movement toward said tire and determine the normal position of said member with respect to said tire.

9. In a pneumatic tire deflation signalling device, in combination, a wheel comprising a pneumatic tire, an audible signal mounted thereon, a member connected with said signal to actuate the same and extending adjacent to said tire, a spring urging said member toward said tire, a means limiting the movement of said member toward said tire to a position in which it is spaced therefrom beyond the path of deformation thereof with the tire running in ordinary condition and in position to be engaged and moved by the tire upon the tire becoming soft, and means adapted to adjust the normal position of said member with respect to the tire.

Signed at Stamford in the county of Fairfield and State of Connecticut this 16 day of February A. D. 1921.

BURLING D. WELLS.